May 17, 1966
F. PORTER
3,251,716
HYDROLYSIS OF LIGNOCELLULOSE MATERIALS WITH
CONCENTRATED HYDROCHLORIC ACID
Filed May 28, 1964
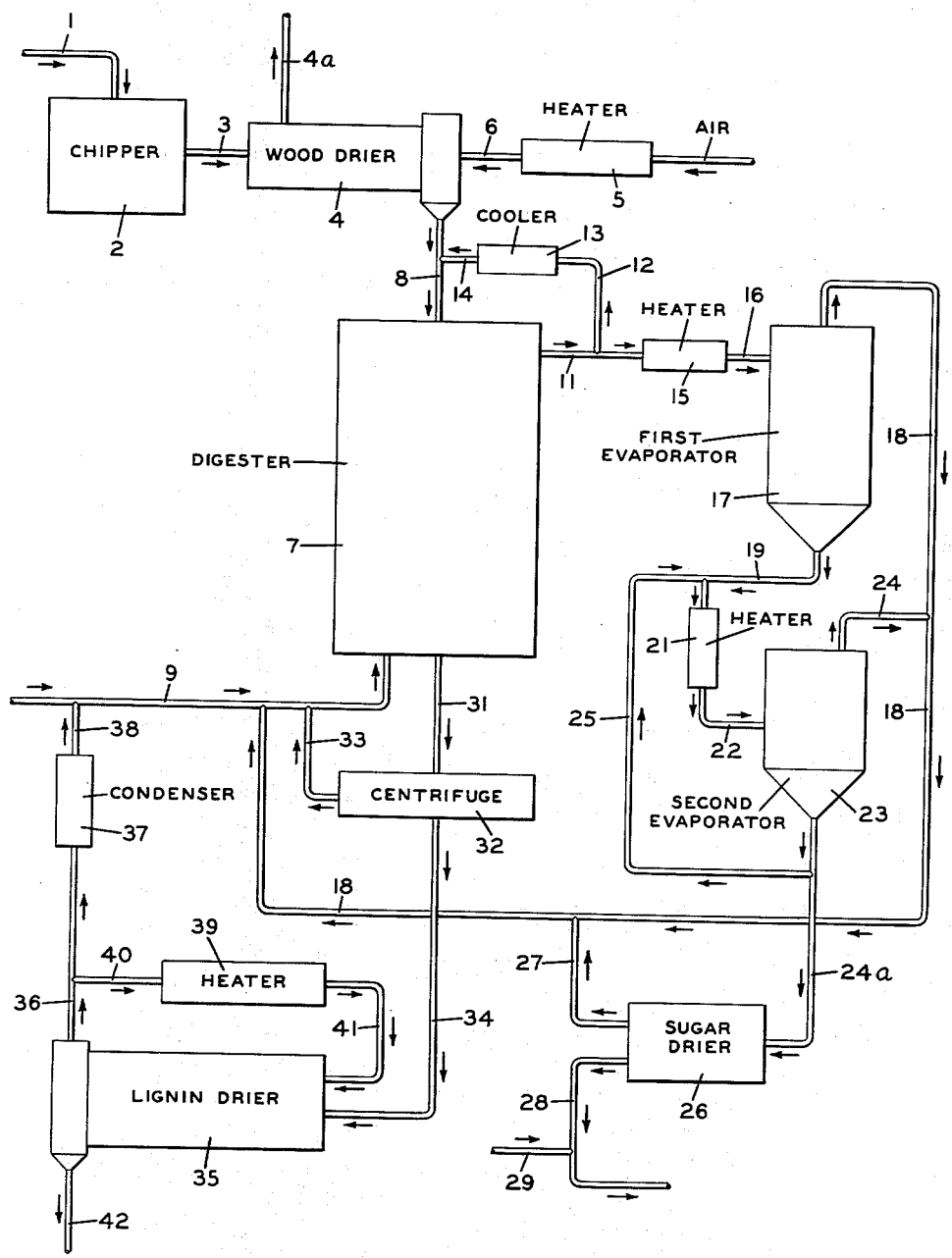
INVENTOR
FRANK PORTER
BY
*Clement J. Vicari*
ATTORNEY

United States Patent Office 3,251,716
Patented May 17, 1966

3,251,716
HYDROLYSIS OF LIGNOCELLULOSE MATERIALS WITH CONCENTRATED HYDROCHLORIC ACID
Frank Porter, Morris Township, Morris County, N.J., assignor to Allied Chemical Corporation, New York, N.Y., a corporation of New York
Filed May 28, 1964, Ser. No. 370,929
4 Claims. (Cl. 127—37)

This invention relates to a process for the hydrolysis of lignocellulose materials with concentrated hydrochloric acid to produce sugars leaving as a residue the lignin content of the lignocellulose and to the recovery of the hydrochloric acid used in the process.

At the present time, there are various procedures for hydrolyzing woody and other lignocellulose materials to produce pentose and hexose sugars which being water soluble are separated from the residual lignin. Aqueous solutions of the sugars may be inoculated with yeast to convert the sugars to a protein nutrient. This nutrient, as well as the sugars themselves, forms a potential source of protein and carbohydrate feed for use in feeding livestock. These known procedures, for hydrolyzing woody or other lignocellulose materials, however, suffer from the disadvantage that the equipment necessary for processing is costly and there is excessive loss of charging material making the procedure economically unattractive. More recently, it has been prposed to conduct the hydrolysis of lignocellulose materials by the so-called concentrated hydrochloric acid process wherien lignocellulose materials are subjected to the action of concentrated hydrochloric acid at various stages and in varying concentrations of the hydrochloric acid. Unfortunately, however, this process is also not entirely satisfactory for large scale commercial production, because the process has the disadvantage of a two-stage hydrolysis reaction with separate treatment of the two hydrolysis products so that the process is only semicontinuous. In addition, the hydrochloric acid finally separated from the lignin in the process is by necessity in very diluted form requiring time-consuming and expensive reconcentrating procedures.

It is an object of the present invention to provide a continuous process for hydrolyzing lignocellulose materials. Another object is to provide a process for hydrolyzing lignocellulose materials with hydrochloric acid whereby the hydrochloric acid is recovered and recycled in the process in concentrated form without the need of expensive time-consuming reconcentrating procedures. Other objects and advantages will be apparent from the following detailed description.

In accordance with the present invention, there is provided a process for the conversion of lignocellulose materials into sugars and lignin which comprises digesting lignocellulose material in a reaction zone with about 41 to 45% concentrated hydrochloric acid, removing from the reaction zone an acid-sugar solution of hexose and pentose sugars, hydrochloric acid, and water, heating said acid-sugar solution to vaporize substantially all the hydrochloric acid from the acid-sugar solution leaving as residue hexose and pentose sugars containing residual hydrochloric acid, returning the separated hydrochloric acid to the reaction zone, admixing water with the residue of hexose and pentose sugars to produce a sugar solution, discharging from the reaction zone, lignin and hydrochloric acid, separating a major portion of the hydrochloric acid from the lignin and returning the hydrochloric acid to the reaction zone, passing a mixture of hot hydrogen chloride gas and water vapor in contact with the lignin to remove the minor portion of hydrochloric acid and returning said removed hydrochloric acid to the reaction zone.

In a more specific embodiment, the process comprises passing a heated inert gas in direct contact with wood chips to reduce the moisture content to 3 to 5%. The wood chips are then passed into a digester counter-current and in contact with concentrated hydrochloric acid of about 42 to 44% concentration at a temperature of 15 to 32° C. under substantially atmosperic pressure and for a sufficient length of time to produce a digester liquor containing pentose and hexose sugars in solution, hydrochloric acid and water. A portion of the digester liquor is withdrawn from the digester, cooled by indirect heat exchange and introduced in direct contact with the wood chips to cool the wood chips to a temperature below about 25° C. prior to introduction into the digester. Another portion of the digester liquor is withdrawn from the digester and heated to a temperature of 55 to 65° C. The heated portion is then introduced into a first evaporation zone maintained at a temperature of 55 to 65° C. and at substantially atmospheric pressure to effect removal of a considerable portion of the hydrochloric acid which is thereafter returned to the digester. The liquor is then withdrawn from the first evaporation zone and heated to a temperature of 55 to 65° C. before passing the liquor to a second evaporation zone which is maintained at 55 to 65° C. under sub-atmospheric pressure. In the second evaporation zone, additional hydrochloric acid remaining in the liquor is removed and returned to the digester. A concentrated solution of pentose and hexose sugars is discharged from the second evaporation zone including water and small amounts of hydrochloric acid and a portion of the solution is heated and recirculated back to the second evaporation zone while the remaining portion is passed through a drying zone maintained at a temperature of 60 to 70° C. under sub-atmospheric pressure. The hydrochloric acid removed from the drying procedure is returned to the digester. A dried sugar product containing about 5% hydrochloric acid is recovered and admixed with a sufficient amount of water to form a sugar solution of pentose and hexose sugars. The lignin containing aqueous hydrochloric acid is discharged from the digester and hydrochloric acid is separated from lignin by centrifuge. The separated hydrochloric acid is thereafter returned to the digester while the lignin from the centrifuge is passed to a heated zone maintained at a temperature of 175 to 360° C. in contact with hydrogen chloride and water vapor. Water vapor and hydrogen chloride gas is discharged from the heating zone, condensed and returned to the digester together with makeup hydrochloric acid and a dried lignin product suitable for use without further treatment is discharged from the heating zone.

The accompanying drawing illustrates a method of carrying out the process of the present invention.

The lignocellulose materials which may be employed in the process of the present invention broadly comprise those classes of lignocellulose materials which stem from plant growth processes and are readily available as waste by-products of various industries. Thus, they may comprise such plant-derived materials as oat hulls, corn stalks, and bagasse. In particular, however, they comprise the woods of various species of trees. The wood may be used in the instant process in the form of sawdust, wood shavings, thin chips, flakes, and the like. To be susceptible to efficient utilization, however, wood chips are preferred having a cross section of about ½ inch to about two inches. Wood chips of the preferred dimension may be provided by introducing the material containing moisture through line 1 into wood chipper 2 which is a conventional wood chipper adapted to reduce the wood particles size to the desired ½- to 2-inch range. The wood chips leave wood chipper 2 and enter wood drier 4 through line 3 where the wood chips are treated to reduce the moisture content to about 3 to 7% based on the weight of the wood. This is effected by passing an inert gas such as air through heater 5, thence through line 6 into wood drier 4. The inert gas which is heated to a temperature of about 250 to 325° C. circulates through wood drier 4 picking up water vapor evolving from the wood chips and the water vapor leaves the wood drier 4 through line 4a where it may be discharged or collected for future use if desired. Prior to digestion of the dried wood chips with the concentrated hydrochloric acid employed in the process, it is desirable to effect cooling of the dried wood. This is desirable because when dried wood is wet with concentrated hydrochloric acid, there is heat produced resulting in loss of hydrogen chloride by vaporization. This heat release can be controlled, however, by circulating through a suitable cooler, a portion of the acid-sugar liquor leaving the digester 7. This is effective not only in minimizing the heat produced in the digester, but also tends to wet the wood permitting the wood to sink into the solution of hydrochloric acid. After the wood chips are treated with the recirculated acid sugar liquor, it is introduced into digester 7 through line 8 where it is intimately contacted countercurrently with about 41 to 45% hydrochloric acid which enters the lower portion of the digester through line 9. The amount and concentration of hydrochloric acid to be mixed with the lignocellulosic material is such as to convert in a single operation the lignocellulosic material into pentose and hexose sugars. A concentration of hydrochloric acid in the range of about 41 to 45% preferably about 42 to 44% concentration is desirable for this purpose. In addition, the liquor to solids charging ratio is maintained at a level of greater than about 6 to 1 preferably about 10 to 1. The digester which may be employed according to the present invention may be any suitable type known in the art which is equipped to permit the lignocellulosic material to pass countercurrent to the concentrated hydrochloric acid with provision for temperature control within the required range for the hydrolysis. Within the digester, the pressure upon the charge is advantageously atmospheric pressure and temperatures employed are within the range of about 15 to 32° C. These conditions are maintained for a sufficient period to convert the lignocellulosic material to pentose and hexose sugars in one operation. A digestion period of about 1 to 4 hours, preferably 2 to 2½ hours is suitable for this purpose. There is produced in the digester an acid-sugar solution comprising hexose and pentose sugars, hydrochloric acid and water. The acid-sugar solution leaves digester 7 through line 11 where a portion is directed through line 12 to cooler 13. In the cooler, the solution is cooled and the recycle stream of cold acid-sugar solution is sent through line 14 in contact with the wood chips leaving wood drier 4 to effect cooling by direct heat exchange for the reasons as previously mentioned. The temperature in the cooler is such that the temperature of the acid-sugar liquor leaving the cooler is maintained at a temperature of about 5 to 20° C. prior to contact with the wood chips and after contact, the wood chips are cooled to a temperature below 25° C. The remaining portion of the acid-sugar solution leaving digester 7 enters heater 15 where the solution is heated to a temperature of about 55 to 65° C. The heated acid-sugar solution then passes through line 16 into the first evaporator 17 where hydrochloric acid is removed from the solution. The evaporator 17 may be of any suitable type and construction known in the art such as, for example, the type which employs a heating medium separated from the liquid to be evaporated by tubular heating surfaces. The temperature within the evaporator 17 is maintained within the range of about 55 to 65° C. at about one atmosphere of pressure, such temperatures being sufficient to evolve vapors of hydrochloric acid which leave the evaporator 17 through line 18 where the hydrochloric acid is sent to line 9 for admixture with makeup hydrochloric acid. The transfer of vapors from one vessel to another may be effected by means of conventional blowers or the vapors may be condensed and the resultant liquid pumped in the usual manner. In evaporator 17, approximately 30 to 40% of hydrochloric acid entering is taken out and directed back to the digester 7. After evaporating the portion of the hydrochloric acid from the first evaporator, the residue comprising water and acid-sugar solution is discharged from evaporator 17 through line 19 and enters heater 21 where the solution leaving the evaporator 17 is reheated to a temperature of about 55 to 65° C. The acid-sugar solution then enters the second evaporator 23 through line 22 under conditions of pressure of about 40 to 60 mm. Hg. In the second evaporator 23, additional vapors of hydrochloric acid are evolved and are discharged from the evaporator through line 24 where they are admixed with the hydrochloric acid leaving the first evaporator through line 18. The residue from the second evaporator 23 comprising about 50 to 60% sugar, water and small amounts of hydrochloric acid is discharged through line 24a, where a portion is recirculated back to heater 21 through line 25 and thence back to the second evaporator 23 through line 22. The remaining portion of the residue from the evaporator 23 enters sugar drier 26 where the concentrated sugar solution containing about 50 to 60% sugar is dried in a vacuum drum drier until only small amounts, less than about 5% acid remains in the mass. A temperature of about 60 to 70° C. under subatmospheric pressure, i.e., about 122 mm. pressure is sufficient for this purpose. Water and hydrochloric acid is discharged from the drier 26 through line 27 where it is admixed with the hydrochloric acid in line 18 and returned to the digester through line 9. The product from the sugar drier containing primarily pentose and hexose sugars is discharged from sugar drier 26 through line 28 where is is dissolved in water, the water being introduced through line 29. The solution of pentose and hexose sugars may be thereafter neutralized with ammonia and sent to yeast growing tanks. The lignin leaving the digester 7 through line 31 including about three to five times its weight of aqueous hydrochloric acid is sent to the centrifuge 32 where approximately 75% of the acid is discharged from the centrifuge through line 33 and admixed with makeup hydrochloric acid entering the digester 7 through line 9. The remaining fraction comprising the lignin and hydrochloric acid is discharged from the centrifuge through line 34 where it enters the lignin drier 35. The gas used to dry the lignin is preferably water-hydrochloric acid vapor which is superheated to a temperature of about 340 to 360° C. and run co-current to the wet lignin. The gas is cooled to about 175° C. as it passes down through the lignin bed which is supported on an agitating device such as a shaker grate. The water-hydrochloric acid vapor leaves the lignin dryer through line 36 where a portion is drawn off and condensed in condenser 37 leaving the condenser through line 38 where it is admixed in line 9 with makeup hydrochloric acid. The main portion is circulated through a super heater 39 entering through line 40 where the water-hydrochloric acid vapor is heated to a temperature of about 340 to 360° C. The water-hydrochloric acid vapor is discharged from the heater 39 through line 41 where it is recycled to the lignin dryer 35. The dry lignin is discharged from the lignin dryer through line 42 where a lignin product, substantially free of moisture, is obtained.

The following example will illustrate the invention.

*Example 1*

In an operation, as illustrated in the drawing, about 1,000 tons wood waste (dry basis) was chipped to about one to two inches maximum and dried in direct contact with 300° C. hot gas such as air or a combination of inert gas-air mixture to a moisture content of 4 to 6%. The wood chips were then mixed with a recycle stream of cold acid-sugar solution before they entered the digester. The cold wet chips were thereafter continuously passed to the top of the digester and contacted 3270 tons of 43% hydrochloric acid entering the bottom of the digester at such rate to give a digestion period of about two hours. The digester was operated at 20 to 30° C. and atmospheric pressure to form an acid-sugar solution.

A portion of the acid-sugar solution leaving the top of the digester was passed to the cooler and recycled to the top of the digester to control digester temperature and soak the wood chips. A second portion was passed to the first evaporator. Composition of acid-sugar solution fed to the first evaporator was 550 tons sugar, 464 tons hydrochloric acid and 705 tons water. The lignin resulting from the digestion was removed from the digestor bottom, centrifuged to recover 43% hydrochloric acid, and finally dried at 350° C. in a stream of hydrochloric acid water vapor.

The acid-sugar solution leaving the first evaporator was then charged to a second evaporator where the sugar concentration reached 50 to 60% sugar in the second evaporator. This solution was passed to a rotating drier operated at 65° C. at 120 mm. where the sugar was dried until about 5% acid remained in the mass. About 550 tons of dried sugar was produced. The dried product from the sugar drier was stirred with water to form a sugar solution. This solution was neutralized with soda ash and ammonia and sent to yeast-growing tanks.

The process conditions and mode of operation are such that the lignin which is finally separated in the process contains amounts of hydrochloric acid which is recovered by a simple procedure without the need for diluting the hydrochloric acid thereby avoiding expensive and time-consuming reconcentrating procedures. In addition, the hydrolysis of the lignocellulosic material to produce hexose and pentose sugars is conducted in one continuous operation.

Although certain preferred embodiments of the invention have been disclosed for purpose of illustration, it will be evident that various changes and modifications may be made therein without departing from the scope and spirit of the invention.

I claim:

1. A process for the conversion of lignocellulose materials into sugars and lignin which comprises digesting lignocellulose material in a reaction zone with about 41 to 45% concentrated hydrochloric acid, removing from the reaction zone an acid-sugar solution of hexose and pentose sugars, hydrochloric acids and water, heating said acid-sugar solution to vaporize substantially all the hydrochloric acid from the acid-sugar solution leaving as residue hexose and pentose sugars, returning the separated hydrochloric acid to the reaction zone, discharging the residue of hexose and pentose sugars, discharging from the reaction zones lignin and hydrochloric acid, separating a portion of the hydrochloric acid from the lignin and returning the hydrochloric acid to the reaction zone, passing a mixture of hot hydrogen chloride gas and water vapor in contact with the lignin containing residual hydrochloric acid to remove said residual hydrochloric acid and returning said removed residual hydrochloric acid to the reaction zone.

2. A process for the conversion of wood chips into sugars and lignin which comprises digesting wood chips in a reaction zone with about 41 to 45% concentrated hydrochloric acid, removing from the reaction zone an acid-sugar solution of hexose and pentose sugars, hydrochloric acid and water, cooling a portion of said acid-sugar solution by indirect heat exchange and introducing said cooled acid-sugar solution in direct contact with the wood chips to cool the wood chips to a temperature below 25° C. prior to introduction into the reaction zone, continuously withdrawing another portion of the acid-sugar solution from the reaction zone, heating the acid-sugar solution to vaporize substantially all the hydrochloric acid from the acid-sugar solution leaving as residue, hexose and pentose sugars containing residual hydrochloric acid, returning the separated hydrochloric acid to the reaction zone, discharging the residue of hexose and pentose sugars, discharging from the reaction zone lignin and hydrochloric acid, separating a portion of the hydrochloric acid from the lignin and returning the hydrochloric acid to the reaction zone, passing a mixture of hot hydrogen chloride gas and water vapor in contact with the lignin containing residual hydrochloric acid to remove said residual hydrochloric acid and returning said removed residual hydrochloric acid to the reaction zone.

3. A process for the conversion of wood chips into sugars and lignin which comprises digesting wood chips in a reaction zone with about 41 to 45% concentrated hydrochloric acid, removing from the reaction zone an acid-sugar solution of hexose and pentose sugars, hydrochloric acid and water, cooling said acid-sugar solution by indirect heat exchange and introducing said cooled acid-sugar solution in direct contact with the wood chips to cool the wood chips to a temperature below 25% C. prior to introduction into the reaction zone, continuously withdrawing another portion of the acid-sugar solution from the reaction zone, heating the portion to a temperature of 55 to 65° C., introducing said heated portion into a first evaporation zone maintained at a temperature of 55 to 65° C. and at substantially atmospheric pressure to effect evaporation and removal of 30 to 40% of the hydrochloric acid contained in the acid-sugar solution, returning the hydrochloric acid to the reaction zone, withdrawing the acid-sugar solution from the first evaporation zone and heating to a temperature of 55 to 65° C., passing said acid-sugar solution to a second evaporation zone maintained under sub-atmospheric pressure, removing additional hydrochloric acid remaining in the acid-sugar solution and returning said hydrochloric acid to the reaction zone, discharging a concentrated solution of pentose and hexose sugars from the second evaporation zone including water and small amounts of hydrochloric acid, recirculating and heating a portion of said solution from the second evaporation zone back to the second evaporation zone, passing the remaining portion through a drying zone maintained at a temperature of 60 to 70° C. under sub-atmospheric pressure, recovering a dried sugar product containing about 5% hydrochloric acid from said drying zone, returning the hydrochloric acid to the reaction zone, discharging from the reaction zone lignin and hydrochloric acid, separating a portion of the hydrochloric acid from the lignin and returning the hydrochloric acid to the reaction zone, passing a mixture of hot hydrogen chloride gas and water vapor in contact with the lignin containing residual hydrochloric acid to remove said residual hydrochloric acid and returning said removed residual hydrochloric acid to the reaction zone.

4. A process for the conversion of wood chips into sugars and lignin which comprises passing a heated inert gas in direct contact with said wood chips to reduce the moisture content to 3 to 5% passing said wood chips into a digester countercurrent and in contact with concentrated hydrochloric acid of about 42 to 44%, maintaining the concentrated hydrochloric acid and the wood chips at a temperature of 15 to 32° C. under substantially atmospheric pressure and for about 2 to 2½ hours to produce a digester liquor containing pentose and hexose sugars in solution, hydrochloric acid and water, withdrawing a portion of the digester liquor from the digester, cooling said digester liquor by indirect heat exchange and introducing said cooled digester liquor in direct contact with the wood chips to cool the wood chips to a temperature below 25° C. prior to introduction into the digester, continuously withdrawing another portion of the digester liquor from the digester, heating the portion to a temperature of 55 to 65° C., introducing said heated portion into a first evaporation zone maintained at a temperature of 55 to 65° C. and at substantially atmospheric pressure to effect evaporation and removal of 30 to 40% of the hydrochloric acid contained in the digester liquor, returning the hydrochloric acid to the digester, withdrawing the liquor from the first evaporation zone and heating to a temperature of 55 to 65% C. and passing said liquor to a second evaporation zone maintained under sub-atmospheric pressure, removing additional hydrochloric acid remaining in the liquor and returning said hydrochloric acid to the digester, discharging a concentrated solution of pentose and hextose sugars from the second evaporation zone including water and small amounts of hydrochloric acid, recirculating and heating a portion of said solution from the second evaporation zone back to the second evaporation zone, passing the remaining portion through a drying zone maintained at a temperature of 60 to 70° C. under sub-atmospheric pressure and recovering a dried sugar product containing about 5% hydrochloric acid returning to the digester the hydrochloric acid, introducing water into the dried sugar to form a sugar solution of pentose and hexose sugars, neutralizing said solution, discharging lignin containing aqueous hydrochloric acid from the digester, separating hydrochloric acid from lignin by centrifuge and returning the hydrochloric acid to the digester, passing the lignin from the centrifuge to a heated zone maintained at a temperature of 175 to 360° C. in contact with hydrogen chloride gas and water vapor, discharging dried lignin from the heating zone, releasing water vapor and hydrogen chloride from the heating zone, condensing the water and hydrogen chloride, returning aqueous hydrochloric acid to the digester, and introducing makeup hydrochloric acid to the digester.

References Cited by the Examiner

UNITED STATES PATENTS

| | | | |
|---|---|---|---|
| 1,544,149 | 6/1925 | Hagglund | 127—37 |
| 2,239,095 | 4/1941 | Hasche | 127—37 |

MORRIS O. WOLK, *Primary Examiner.*

M. E. ROGERS, *Assistant Examiner.*